(12) United States Patent
Fujiwara

(10) Patent No.: US 7,016,527 B2
(45) Date of Patent: Mar. 21, 2006

(54) METHOD FOR PROCESSING IMAGE DATA AND MODELING DEVICE

(75) Inventor: Koji Fujiwara, Osaka (JP)

(73) Assignee: Minolta Co., Ltd., Osaka (JP)

( * ) Notice: Subject to any disclaimer, the term of this patent is extended or adjusted under 35 U.S.C. 154(b) by 711 days.

(21) Appl. No.: 10/066,609

(22) Filed: Feb. 6, 2002

(65) Prior Publication Data

US 2002/0150288 A1 Oct. 17, 2002

(30) Foreign Application Priority Data

Feb. 9, 2001 (JP) .............................. 2001-033179

(51) Int. Cl.
*G06K 9/00* (2006.01)

(52) U.S. Cl. .................................... 382/154

(58) Field of Classification Search ............... 382/100, 382/103, 154; 345/419, 420
See application file for complete search history.

(56) References Cited

U.S. PATENT DOCUMENTS

| | | | |
|---|---|---|---|
| 4,710,876 A | 12/1987 | Cline et al. | |
| 5,307,072 A | 4/1994 | Jones, Jr. | |
| 5,402,582 A | 4/1995 | Raab | |

FOREIGN PATENT DOCUMENTS

| | | |
|---|---|---|
| JP | 61-138377 | 6/1986 |
| JP | 1-175076 | 7/1989 |
| JP | 6-185993 | 7/1994 |
| JP | 2000-194859 | 7/2000 |

OTHER PUBLICATIONS

"The Dynamic Analysis of Apparent Contours" Cipolla et al., University of Oxford, pp. 616-623, CH2934-8/90/0000/061$01.00 1990 IEEE.
Chapter III of "Three-Dimensional Computer Vision-A Geometric Viewpoint", FAUGERAS, MIT Press, 1996, pp. 33-65.

*Primary Examiner*—Vikkram Bali
(74) *Attorney, Agent, or Firm*—McDermott Will & Emery LLP (57) ABSTRACT

A method for processing image data and a modeling device are provided in which the total time necessary for performing area extraction of plural images can be shortened. The image data process, in which an object area corresponding to an object is extracted from plural images obtained by shooting the object from different eye points, comprises the steps of obtaining shoot condition data indicating the positional relationship between a camera and the object when plural object images are obtained and an optical parameter for image formation, and estimating the object area in one image in accordance with the object area extracted from another image and the shoot condition data for the other image.

13 Claims, 8 Drawing Sheets

METHOD FOR PROCESSING IMAGE DATA AND MODELING DEVICE

This application is based on Japanese Patent Application No. 2001-033179 filed on Feb. 9, 2001, the contents of which are hereby incorporated by reference.

BACKGROUND OF THE INVENTION

1. Field of the Invention

The present invention relates to a method and device for processing an image in which a portion corresponding to a subject is extracted from plural shot image.

2. Description of the Prior Art

In various fields such as a computer graphics, an industrial design, or making of 3-D web contents, a three-dimensional data input system is used for digitizing a solid shape of an object.

One of three-dimensional data input methods is called a shape-from-silhouette method. In this method, plural images obtained by shooting an object are used for extracting a shield contour (i.e., a silhouette) form each of the images, and a three-dimensional shape of the object is estimated from the extraction result and information of shooting positions. As an example of the application of the shape-from-silhouette method, Japanese patent publication No. 61-138377 discloses a technique for reconstructing a shape of an object by disposing a virtual object made of plural shape elements called voxels gathering in a three-dimensional virtual space, calculating a common portion of visual volumes determined by eye points of shooting and the shield contours, and connecting the voxels corresponding to the common portion.

Accuracy in reconstructing a shape of an object using the shape-from-silhouette method depends on how accurately the shield contours are extracted from each image. Under present circumstances, it is difficult to obtain a good result of extraction that can satisfy the demand of a user by completely automatic image processing, and an instruction or a correction is required to the user. Using a sophisticated image processing technique that utilizes knowledge of an object and a background, the accuracy of the extraction will be improved to some extent. However, it will require much time for inputting the knowledge, the object is limited, or the system is expensive. Moreover, even if a technique of extracting shield contours from shot images by disposing a screen of a uniform color as a background for color clustering, a partial error of extraction cannot be avoided since real background color is not uniform due to a shadow or unevenness of lighting.

On the other hand, in order to reproduce a shape of an object precisely and correctly by the shape-from-silhouette method, as many portions as possible of a surface of the object should appear as shield contours in the images. A surface having a large curvature should be shot from various positions. Therefore, the number of necessary images becomes extremely large for an object having a complicated relief.

Conventionally, there is a problem that a processing time necessary for extracting the shield contours increase proportionally to the number of images necessary for reconstructing the shape of the object, and that a burden of the user who corrects the result of the extraction increases.

SUMMARY OF THE INVENTION

An object of the present invention is to shorten a total time necessary for extracting an area for plural images.

According to one aspect of the present invention, a method for processing image data is provided. The method comprises the steps of performing area extraction for each of the plural image sequentially. When performing the area extraction of the second and subsequent images, the result of the previous area extraction is reflected so as to determine the area to be extracted. As the order of the extraction process becomes later, the extraction results of more images are reflected, so that the area of the extraction target is narrowed and the extraction process time becomes short. Consequently, the total time necessary for area extraction of plural images is shortened compared with the case where the area extraction is performed individually without considering relationship between each image and other images.

The reflection of the extraction result is realized by projecting a visual volume determined by the extracted area and the eye point when the image was obtained onto the image to be processed. Namely, the method comprises the steps of arranging the plural images in a three-dimensional virtual space in synchronization with the positional relationship between the object to be shot and the shooting position corresponding to each of the plural images, and checking which part of the other image the visual volume obtained by the area extraction for a certain image corresponds to. The visual volume is a cone-like space enclosed by line of sights passing through a shield contour, and the object exists within this visual volume. Therefore, there is always an area to be extracted within the area of the projected image of the visual volume. Thus, the target area of the area extraction is limited to the part of the image on which the visual volume is projected. In order to improve the accuracy of the projection, it is necessary to obtain an image formation condition (an optical parameter) for shooting along with information of the shooting position. If all the images are obtained by one camera, the optical parameter of the camera is necessary. If plural cameras are used, the optical parameters of the cameras are necessary.

DESCRIPTION OF THE PREFERRED EMBODIMENTS

Hereinafter, the present invention will be explained more in detail with reference to embodiments and drawings.

Figure 1:
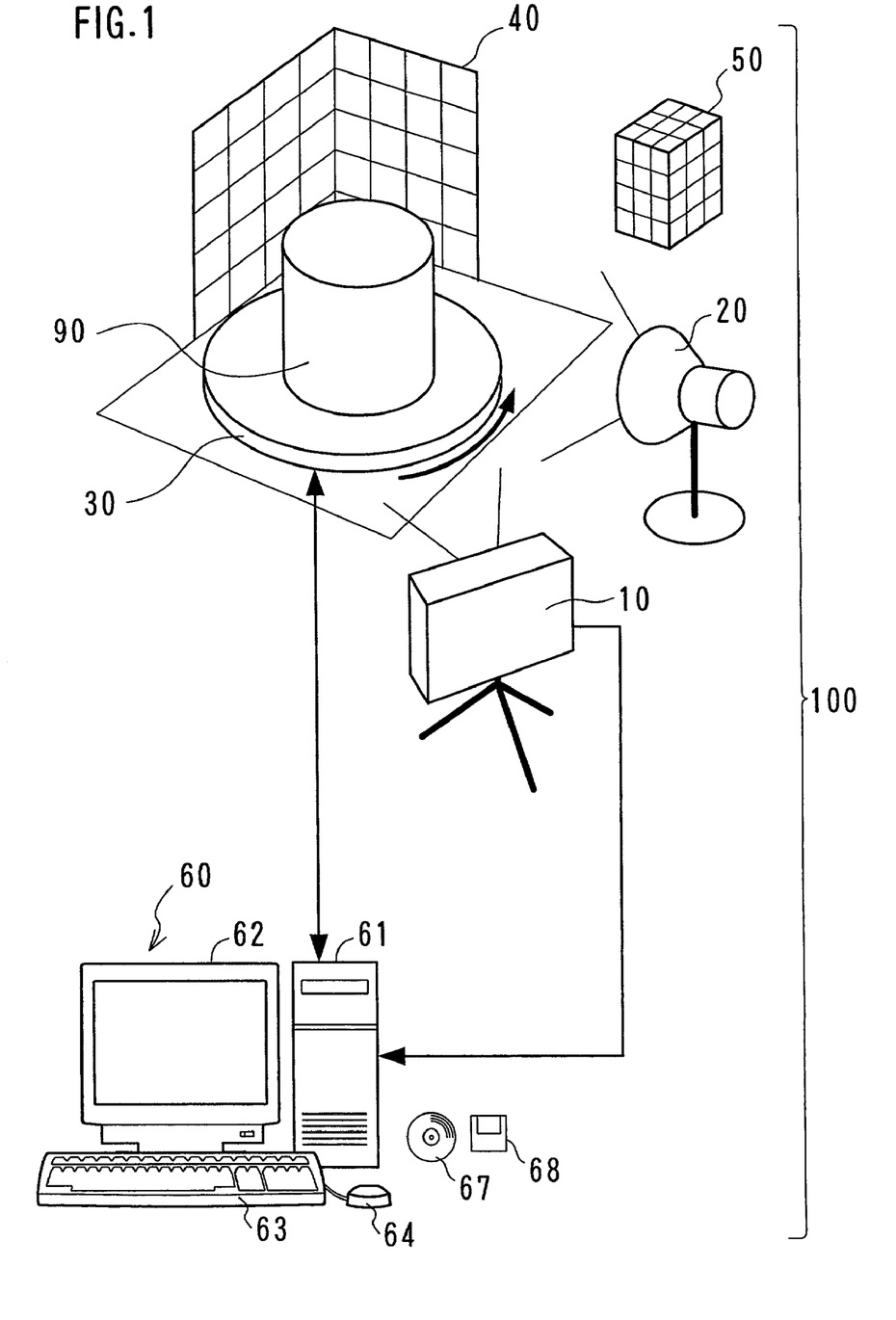
FIG. 1 is a diagram showing a modeling system according to the present invention.

FIG. 1 is a diagram showing a modeling system according to the present invention.

Figure 8:
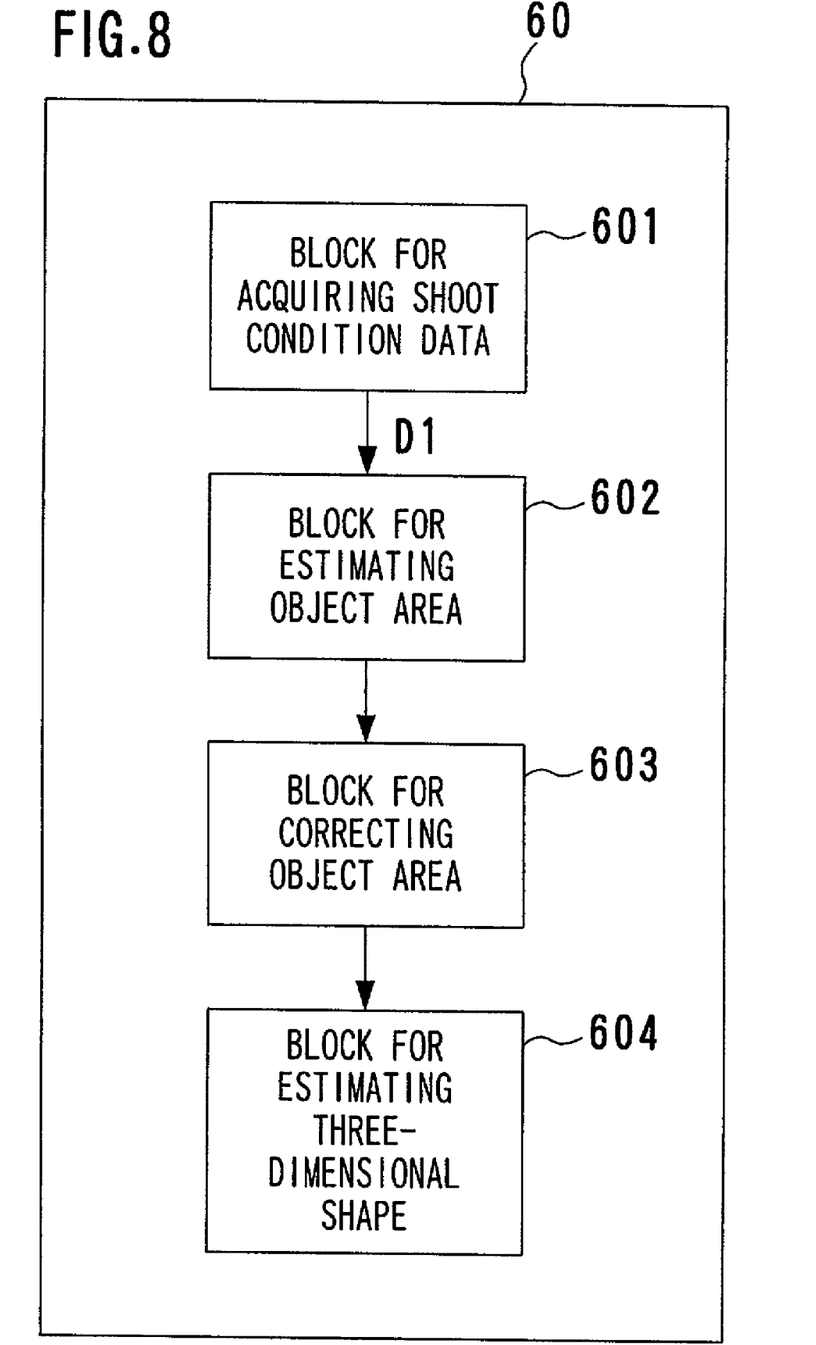
FIG. 8 shows a functional configuration of an image data processor and a modeling device.

The modeling system 100 comprises a digital camera 10, a lighting lamp 20, a rotating table 30, a camera calibration tool 40, a rotation axis calibration tool 50 and a computer 60. The digital camera 10 is used for taking picture of an object 90 placed on the rotating table 30. The shooting is performed plural times while changing positional relationship to the object 90. Plural images obtained by shooting the object 90 are transmitted to the computer 60, which uses them for modeling the object 90. Pixels of the image indicate color vector values of red, green and blue colors. The computer 60 is a data processing system including a body 61, a display 62, a keyboard 63 and a mouse 64. A program recorded in a CD-ROM 67 or another medium 68 is installed into the computer 60. The program makes the computer 60 work as an image data processor and a modeling device. The image data processor includes three blocks 601, 602 and 603 as shown in FIG. 8 and extracts an object area corresponding to the object 90 from each of the plural images. The modeling device includes blocks 601, 602 and 603 and a block 604 and reconstructs the shape in accordance with the extracted object areas. The block 601 acquires shoot condition data D1 that indicate the positional relationship between the digital camera 10 and the object 90 when shooting and an optical parameter for image formation. The block 602 estimates the object area in one image in accordance with the object area extracted from another image and the shoot condition data D1. The block 603 corrects the object area in accordance with operational input. The block 604 estimates the three-dimensional shape of the object 90 in accordance with the object areas extracted from plural images and corrected and the shoot condition data D1. Between the digital camera 10 and the computer 60, data can be transmitted online using a cable or an infrared communication or offline using a portable recording medium.

The rotating table 30 is painted with a known color (Cr). The rotating table 30 is disposed in front of the tool 40, and the rotation angle thereof is controlled by the computer 60 via a cable. The user of the modeling system 100 can adjust the rotation angle of the rotating table 30 by operating the mouse 64. The tool 40 is a solid object whose surface is painted with a known color (Cb) on which thin lines are drawn in a grid using another color. The relationship between three-dimensional positions of each of the grid points of the tool 40 and a reference position of the tool 40 is known. The three-dimensional coordinate system whose origin is the reference position of the tool 40 defines world coordinates in the virtual space established on the memory of the computer 60. The digital camera 10 is supported by a tripod and is placed so that the object 90 or the tool 50 on the rotating table 30 is within the angle of view. In the online data transmission, the computer 60 receives a color image from the digital camera 10 responding to the mouse operation of the user. The position and posture of the digital camera 10 can be changed by moving the tripod, and the angle of view in shooting can be set by zoom adjustment. The tool 50, similarly to the tool 40, is a solid object whose surface is painted with a color on which thin lines are drawn in a grid using another color. Also in tool 50, the relationship between three-dimensional positions of each of the grid points and the reference position is known. The three-dimensional coordinate system whose origin is the reference position of the tool 50 defines object coordinates with respect to the object 90. Since the rotation of the rotating table 30 is equivalent to the relative movement of the camera to the object 90, the relative movement between the camera coordinates on the basis of the eye position of each shooting can be described using the object coordinates. The lighting lamp 20 is disposed for lighting the rotating table 30 so that no shade is formed on the object 90 or the tool 50.

Figure 2:
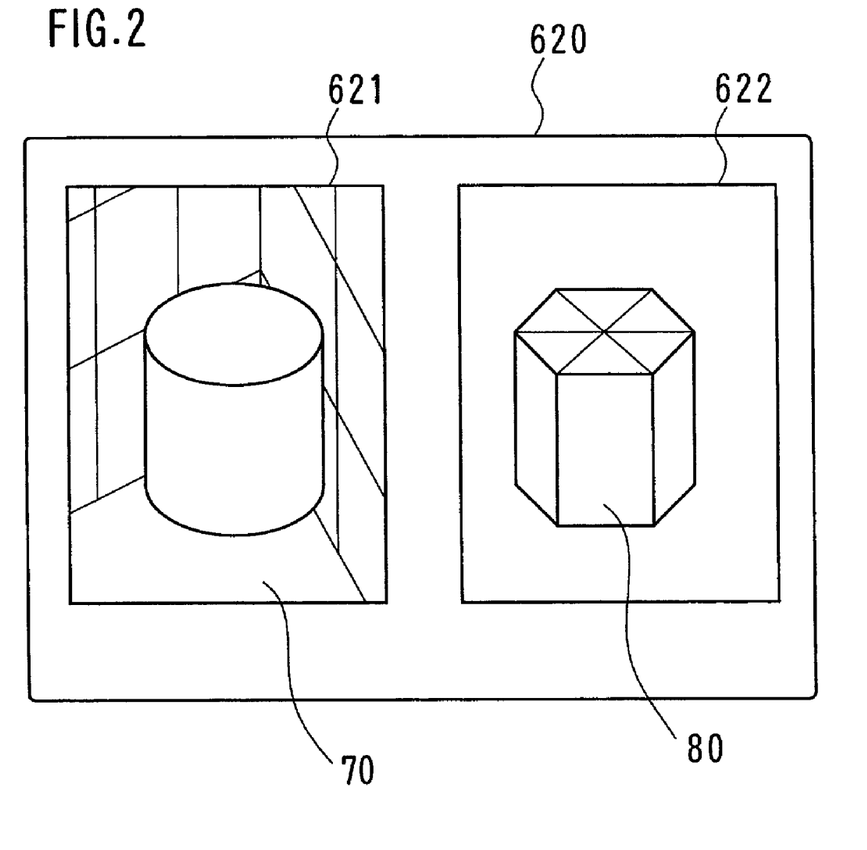
FIG. 2 shows a screen structure of a monitor display.

FIG. 2 shows a screen structure of a monitor display. The display screen 620 of the display 62 has two display areas (windows) 621 and 622. The display area 621 displays an image 70 inputted from the digital camera 10 or a composed image of the image 70 on which an extracted area is overlaid that is a result of an area extraction process that will be explained later. The extracted area can be corrected if necessary when the user erases or adds a unit area using the mouse 64. In addition, the display area 622 displays a three-dimensional shape model 80 with texture mapping on the process or after the process of reconstruction in the virtual space. The user can modify the position, the posture, the angle of view or others of the virtual camera in the virtual space that views the three-dimensional shape model 80 by operating the mouse. In addition, the user can select a shading display instead of the texture mapping display. In the shading display, the position of the virtual light source in the virtual space can be set freely by operating the mouse.

Figure 3:
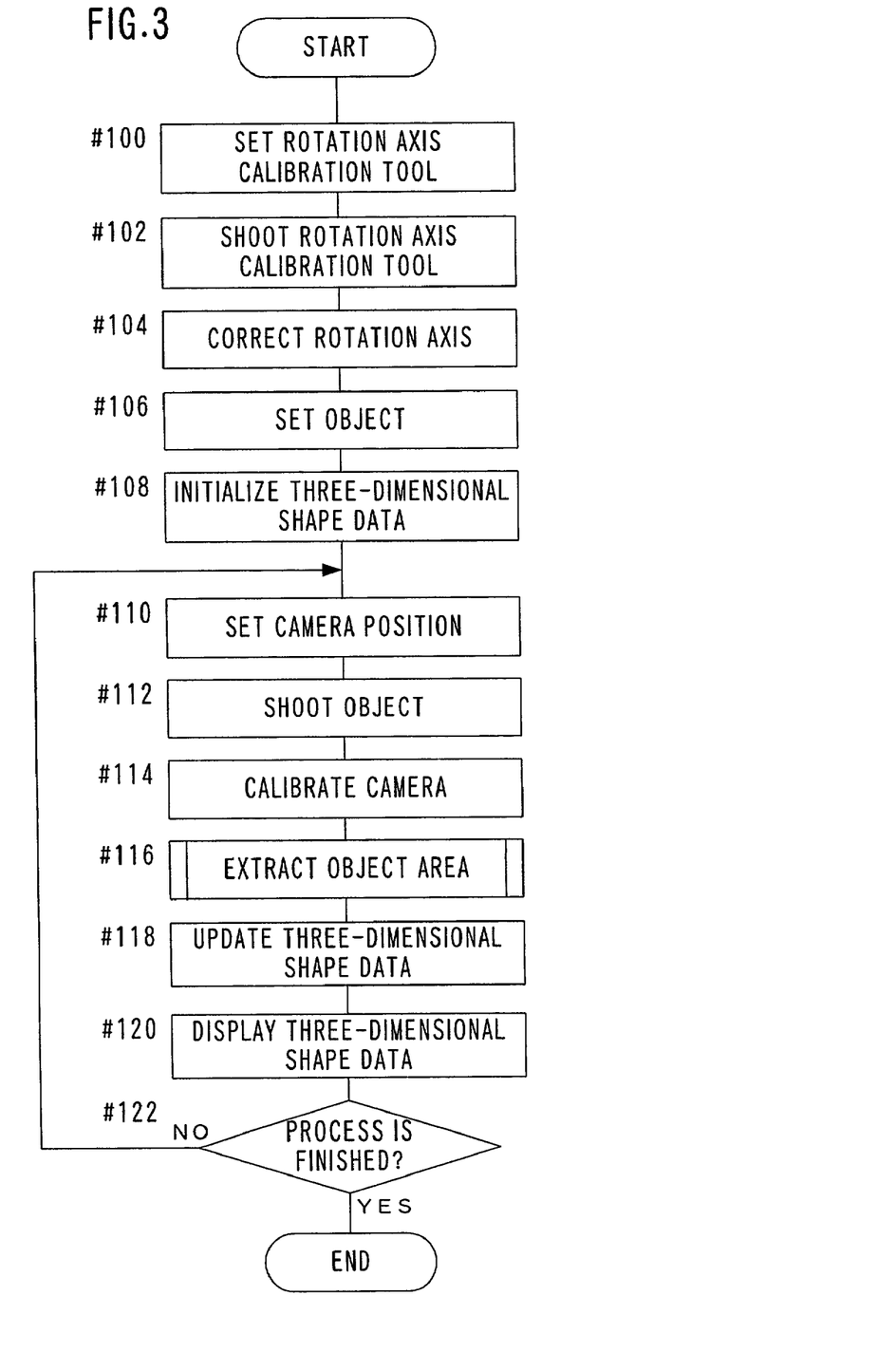
FIG. 3 is a flowchart showing a general procedure of modeling.

FIG. 3 is a flowchart showing a general procedure of the modeling.

[1] In Step #100, setting of the tool 50 is performed. The user places the tool 50 on the rotating table 30 so that at least two faces of the tool 50 are within the field of view of the digital camera 10.

[2] In Step #102, the tool 50 is shot. The rotating table 30 is set to the state having the rotation angle $\theta_0$ for shooting, and then the rotating table 30 is rotated while fixing the eye position of the digital camera 10 without moving the same for shooting in the state having the rotation angle $\theta_0'$. Thus, two images $I_0$ and $I_0'$ are obtained.

[3] In Step #104, correction of the rotation axis is performed. In the state where the image $I_0$ is displayed, the user operates the mouse 64 so as to put the cursor on one of the grid points of the camera calibration tool 40, clicks the mouse and inputs a predetermined grid point number. After repeating this operation for plural grid points, the user instructs the computer 60 to calculate a projection matrix $P_0$ that gives a geometric relationship between the world coordinates and the pixel coordinate of the image $I_0$. An example of the calculation method is described in the third chapter of "Three-Dimensional Computer Vision-A Geometric Viewpoint" by O. Faugeras, MIT Press, 1996. The computer 60 calculates 3×4 projection matrix $P_0$ from the world coordinates at the rotation angle $\theta_0$ and decomposes the projection matrix $P_0$ into a 3×3 internal parameter matrix $A_0$, a 3×3 rotation matrix $R_0$ and a three-dimensional parallel movement vector $t_0$. Namely, this process is equivalent to calculate the projection matrix $P_0$, the internal parameter matrix $A_0$, the rotation matrix $R_0$ and the parallel movement vector $t_0$ satisfying the following equation when $(X_w, Y_w, Z_w)$ denotes the value of the world coordinates and $(x_0, y_0)$ denotes the value of the image coordinates of the camera having the rotation angle $\theta_0$.

$$\lambda \begin{bmatrix} x_0 \\ y_0 \\ 1 \end{bmatrix} = P_0 \begin{bmatrix} X_w \\ Y_w \\ Z_w \\ 1 \end{bmatrix} \tag{1}$$

$$P_0 = A_0 [R_0 \ t_0]$$

Thus, the conversion of the world coordinates $(X_w, Y_w, Z_w)$ into the camera coordinates $(X_0, Y_0, Z_0)$ by the camera having the rotation angle $\theta_0$ is given as follows, so that $R_0$ and $t_0$ are stored in the memory of the computer 60.

$$\begin{bmatrix} X_0 \\ Y_0 \\ Z_0 \end{bmatrix} = R_0 \begin{bmatrix} X_w \\ Y_w \\ Z_w \end{bmatrix} + t_0 \qquad (2)$$

Next, similarly to the case of $P_0$, for the image $I_0$, the projection matrix $O_0$ from the object coordinates at the rotation angle $\theta_0$, the internal parameter matrix $B_0$, the rotation matrix $Q_0$, and the parallel movement vector $s_0$ are calculated.

In the same way, for the image $I_0'$, the projection matrix $O_0'$, from the object coordinates at the rotation angle $\theta_0'$ the internal parameter matrix $B_0'$, the rotation matrix $Q_0'$, and the parallel movement vector $s_0'$ are calculated. The camera coordinate expression of the point $(o_x, o_y, o_z)$ on the rotation axis by the camera having the rotation angle $\theta_0$ is calculated as $(o_x, o_y, o_z)$ that satisfies the following equation.

$$\begin{bmatrix} o_x \\ o_y \\ o_z \\ 1 \end{bmatrix} = T \begin{bmatrix} o_x \\ o_y \\ o_z \\ 1 \end{bmatrix} \qquad (3)$$

$$T = \begin{bmatrix} Q_0'Q_0^t & -Q_0'Q_0^t s_0 + s_0' \\ o^t & 1 \end{bmatrix}$$

Here, the fourth vector $(o_x, o_y, o_z, 1)^t$ corresponds to an eigenvector that corresponds to an eigenvalue "1" of the matrix T. Furthermore, the camera coordinate expression of the unit normal vector $(n_x, n_y, n_z)^t$ of the rotation axis by the camera having the rotation angle $\theta_0$ is calculated as a unit eigenvector corresponding to the eigenvalue 1 of the matrix $Q_0'Q_0^t$, when the sign of the calculated vector $(n_x, n_y, n_z)^t$ is reversed if the sign of the value calculated with the following equation is different from $\sin(\theta_0'-\theta_0)$.

$$s = \left( \begin{bmatrix} n_x \\ n_y \\ n_z \end{bmatrix} \times \begin{bmatrix} o_x \\ o_y \\ o_z \end{bmatrix} \right)^t Q_0'Q_0^t \begin{bmatrix} o_x \\ o_y \\ o_z \end{bmatrix} \qquad (4)$$

The calculated parameters $(n_x, n_y, n_z)$ and $(o_x, o_y, o_z)$ of the rotation axis are stored in the memory of the computer 60.

[4] In Step #106, setting of the object is performed. The object 90 is placed on the rotating table 30 so that the entire object 90 is within the field of view of the digital camera 10. The object 90 is fixed using a tape or others if necessary, so that the object 90 remains in a stationary position.

[5] In Step #108, the three-dimensional shape data are initialized. In the virtual space, voxels whose sizes and quantities are designated by the user are arranged in a three-dimensional manner. On this occasion, the area where the voxels are arranged is set sufficiently larger than the area of the virtual space in which the object 90 is expected to exist.

[6] In Step #110, the camera position is set. The user determines the positional relationship between the object 90 and the digital camera 10 by changing the position or the posture of the digital camera 10 or by rotating the rotating table 30. On this occasion, the computer 60 automatically stores the rotation angle $\theta_i$ of the rotating table 30 in the memory.

[7] In Step #112, shooting is performed. Using the digital camera 10, the user takes a picture of the object 90 so as to obtain the i-th (i=2, 3, 4, . . . ) image $I_i$ of the object 90.

[8] In Step #114, correction of the camera is performed. Similarly to the process in Step #104, concerning the image $I_i$, the user operates the mouse 64 for designating plural grid points of the tool 40 for correcting the camera, and the computer 60 executes the following calculation. First, a 3×4 projection matrix $P_i'$ from the world coordinates at the rotation angle $\theta_0$ of the camera having a new eye point is calculated, and the projection matrix $P_i'$ is decomposed into a 3×3 internal parameter matrix $A_i$, a 3×3 rotation matrix $R_i'$ and a three-dimensional parallel movement vector $ti'$. Then, considering the rotation of the rotating table 30, a projection matrix $P_i$ at the rotation angle $\theta_i$ of the camera having an eye point i is calculated as follows, so that the projection matrix $P_i$ and parameters $A_i$, $R_i$ and $t_i$ obtained by decomposing the projection matrix $P_i$ are stored in the memory of the computer 60.

$$P_i = A_i[R_i\ t_i] = A_i[Q_iR_i'\ Q_it_i' + s_i] \qquad (5)$$

$$= A_i[Q_iR_0(R_i')^t - Q_iR_0(R_i')^t t_i' + Q_it_0 + s_i]$$

$$Q_i = \cos(\theta_i - \theta_0)I + (1 - \cos(\theta_i - \theta_0))$$

$$\begin{bmatrix} n_x \\ n_y \\ n_z \end{bmatrix} [n_x\ n_y\ n_z] + \sin(\theta_i - \theta_0)N_x$$

$$N_x = \begin{bmatrix} 0 & n_z & -n_y \\ -n_z & 0 & n_x \\ n_y & -n_x & 0 \end{bmatrix}$$

$$s_i = [I - Q_i]\begin{bmatrix} o_x \\ o_y \\ o_z \end{bmatrix}$$

Figure 4A:
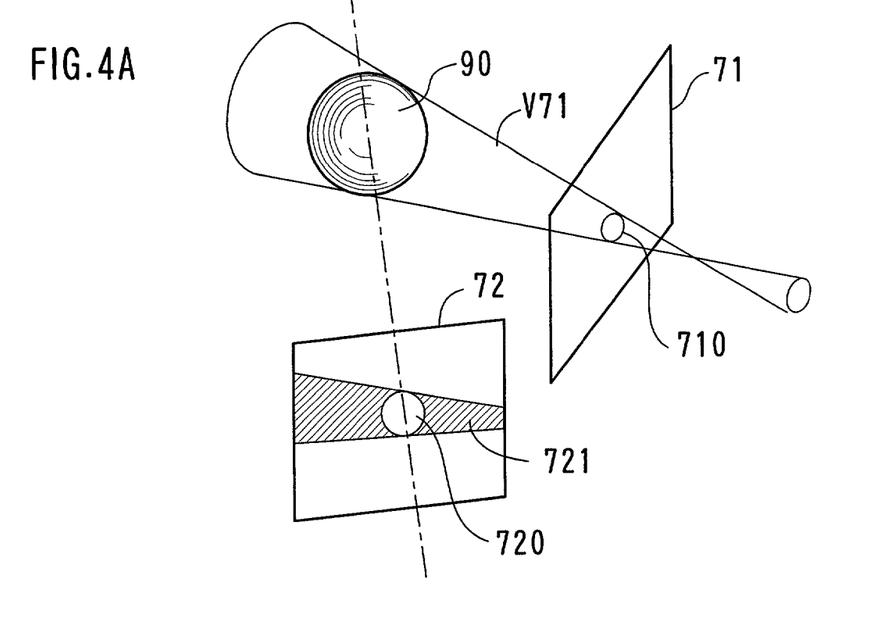
FIGS. 4A and 4B show a concept of a method for extracting an object area.
Figure 4B:
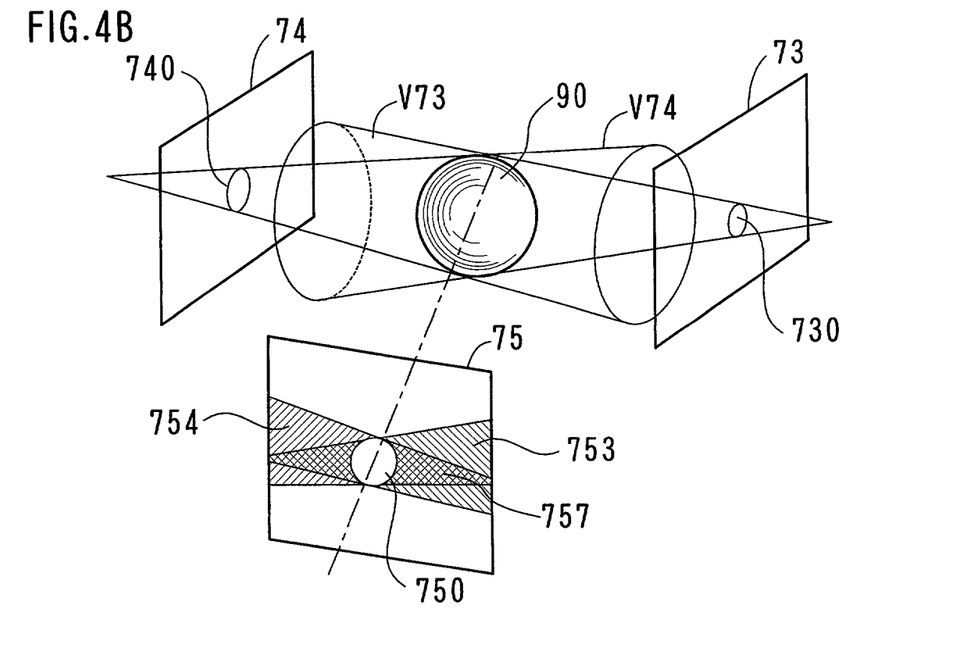

[9] In Step #116, the object area is extracted. As shown in FIG. 4A, for the image 72 noted as an extraction process target (the i-th image $I_j$), the visual volume V71 enclosed by the lines of sight passing the object area 710 in the processed image 71 [j-th (j=1, 2, . . . , i–1) image $I_j$] and the boundary thereof from outside (the shield contour) is projected, and the projection image area 721 in the image 72 is calculated. Color discrimination of the projection image area 721 is performed for extracting the object area 720, and the extraction result is displayed on the above-mentioned display area 621 of the display 62. The user corrects the extraction result by operating the mouse, if necessary. In this way, if the object area is already extracted from the plural images when performing the extraction process about the noted image, the plural images are referred. Namely, the plural visual volumes are projected onto the noted image, so that the area where the projection image areas overlap one another is determined. Then, color discrimination is performed for the area where the projection image areas overlap each other so that the object area is extracted. In FIG. 4B, the visual volume V73 corresponding to the object area 731 in the image 73 and the visual volume V74 corresponding to the object area 741 in the image 74 are projected onto the image 75. The object area 750 in the image 75 is completely included in the overlap area 757 where the projection image area 753 corresponding to the visual volume V73 and the projection image area 754 corresponding to the visual volume V74.

Figure 5:
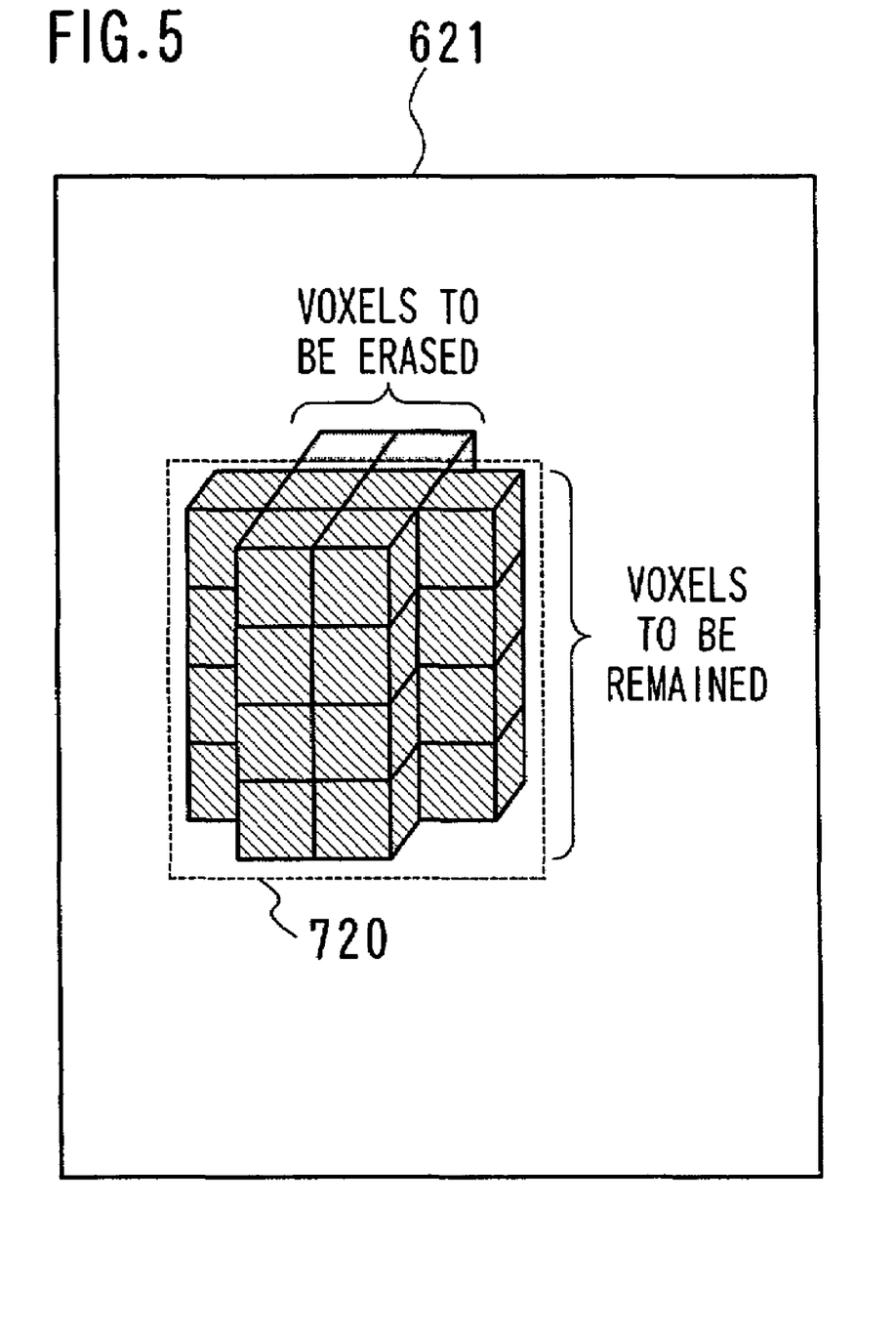
FIG. 5 shows a concept of update of a three-dimensional shape model.

[10] In Step #118, the three-dimensional shape data are updated. Using the projection matrix $P_i$ corresponding to the image $I_i$ that was required in the above-mentioned Step #114, all the voxels in the virtual space are projected onto the image $I_i$ as shown in FIG. 5. Only the voxels included within the object area 720 completely are remained, while all the other voxels are erased.

[11] In Step #120, the three-dimensional shape data are displayed. A technique such as Marching Cube technique described in U.S. Pat. No. 4,710,876, "System and method for the display of surface structures contained within the interior region of a solid body" is used for converting voxel data into polygon mesh. Corresponding to designation of the display form, the three-dimensional shape model is displayed with texture mapping or shading process.

[12] In Step #122, it is decided whether the subsequent process should be performed or not. The user compares the three-dimensional shape model displayed on the display 62 with the real object 90 and instructs the computer 60 to stop the process if the shape is sufficiently reproduced. If the user decided that the shape is not sufficiently reproduced, he or she instructs the computer 60 to continue the process. In this case, the process goes back to Step #110 for taking a picture of another position or posture different from the previous one.

Figure 6:
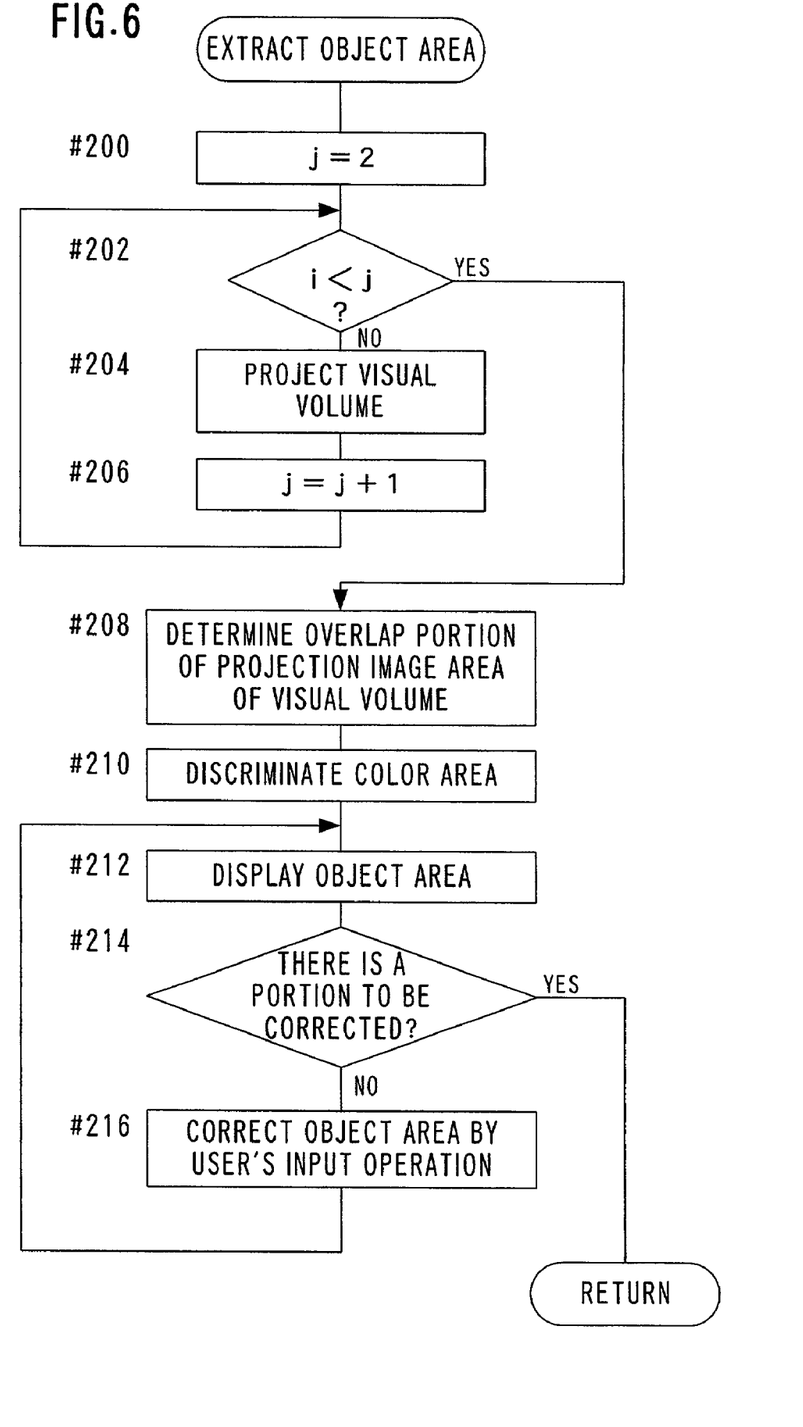
FIG. 6 is a flowchart showing a detail procedure for extracting the object area.

FIG. 6 is a flowchart showing a detail procedure for extracting the object area.

[1] In Step #200, the referred image is initialized. As a referred image that is used for extracting the object area, one of images whose object areas are already extracted is selected.

[2] In Step #202, non-referred image is checked. It is checked whether all the images that can be referred to are used or not. If all the images are already referred to, the process goes to Step #208. If there is an image that was not referred to, the process goes to Step #204.

[3] In Step #204, the visual volume is projected. Tracing the boundary of the object area $S_j$ of the image $I_j$ from any point in the counterclockwise direction, lines of sight passing through the boundary are projected onto the image $I_i$ one by one, and coefficient vectors $m_{ji}^+$ and $m_{ji}^-$ of the projection line of sight at both ends of the area where the line of sight projected onto the image Ii is scanned are stored in the memory of the computer 60. If plural object areas $S_j$ are in the image $I_j$, the coefficient vectors $m_{ji}^+$ and $m_{ji}^-$ of the projection line of sight at both ends are stored in the memory of the computer 60 for each of the object areas $S_j^l$ (l=1, 2, ..., $M_j$) in accordance with the above-mentioned procedure. The detail will be explained later.

[4] In Step #206, the next image to be referred is set. As the next image to be referred, one that can be referred to and is not yet referred to is selected.

[5] In Step #208, overlap portion of projection image areas of the visual volume is determined. Among the pixels $p_k$ (k=1, 2, ..., $N_j$) of the image $I_i$, a pixel area that satisfies either of the two following conditions is determined. This area becomes an intersection area v of the projection image areas, and the object area to be determined is included in this area. A binary image $H_i$ having the pixel value "1" in the determined intersection area v and the pixel value "0" in the other area is made and is stored in the memory of the computer 60.

Condition 1:

$$[x_k y_k 1]^t m_{ji}^+ \leq 0 \text{ AND } [x_k y_k 1]^t m_{ji}^+ \geq 0 \quad (6)$$

for all j=1,2, ... i−1, l=1,2, ..., $M_j$

Condition 2:

$$[x_k y_k 1]^t m_{ji}^+ \geq 0 \text{ AND } [x_k y_k 1]^t m_{ji}^+ \leq 0 \quad (7)$$

for all j=1,2, ... i−1, l=1,2, ..., $M_j$

Here, it is supposed that the coordinate value of the pixel $p_k$ is given as $(x_k, y_k)$.

[6] In Step #210, color discrimination is performed. A pixel area where the pixel value corresponding to the binary image $H_i$ is "1" and the pixel value corresponding to the image $I_i$ satisfies the following condition is determined, and a binary image $G_i$ having the pixel value corresponding to the determined pixel area of "1" and the other pixel value of "0" is generated.

$$\|c_k - c_b\| > t_b \text{ OR } \|c_k - c_r\| > t_r \quad (8)$$

Here, reference characters $c_b$ and $c_r$ denote a color vector of the color Cb of the tool 40 and the color vector of the color Cr of the rotating table 30, respectively. The reference character $c_k$ denotes the color vector of the pixel $P_k$. The reference characters $t_b$ and $t_r$ are threshold level constants given by the user.

An opening process of a morphology operation is performed for the obtained binary image $G_i$, and the result of the process is saved. The pixel having the binary image value of "1" is a pixel that was estimated to belong to the object area. The opening process of the morphology operation is performed for eliminating grid lines drawn on the tool 40 from the extraction result.

[7] In Step #212, the object area is displayed. An image $I_j'$ is generated in which the pixel value of the area where the pixel value corresponding to the binary image Hi is "1" is the vector indicating the display color Co of the intersection area and the pixel value in the other area is the vector indicating the background display color Cg. Next, an image $J_i$ is generated in which the color generated by mixing colors of pixels corresponding to the image $I_j'$ and the image $I_j$ is the color of each pixel. Then, the boundary of the pixel area where the pixel value of the binary image $G_i$ is "1" is drawn on the image $J_i$ with a dotted line, so as to display on the display area 621.

[8] In Step #214, the user decides where correction is necessary or not. The user observes the display content of the display area 621. If he or she decides that the real object area is different from the extracted area whose boundary is indicated by the dotted line, he or she performs a predetermined mouse operation for instructing the computer 60 to go to Step #216. If the user decides there is no portion to be corrected, he or she instructs the computer 60 to go to the above-mentioned Step #118.

[9] In Step #216, the object area is corrected. If the extracted area lies off the real object area, the user can set the pixel value of the binary image $G_i$ corresponding to the area off the real object area to "0" by tracing the area with a cursor while dragging the mouse 64. Moreover, if the user decides that the extracted area is partially short of the real object area, he or she can set the pixel value of the binary image $G_i$ corresponding to the shortage area to "1" by tracing the area with a cursor while dragging the mouse 64. The image $J_i$ can be changed in the same way as in Step #212. Usually, the intersection area v of the projected visual volume includes the real object area completely, so the user is not required to correct the area outside the intersection of the visual volumes, resulting in reduction of the user's burden. In addition, the area where the correction is not required becomes larger in general as later the area of the image is extracted. Therefore, as the area extraction is performed for each image, the user's burden of the correction is less.

Figure 7:
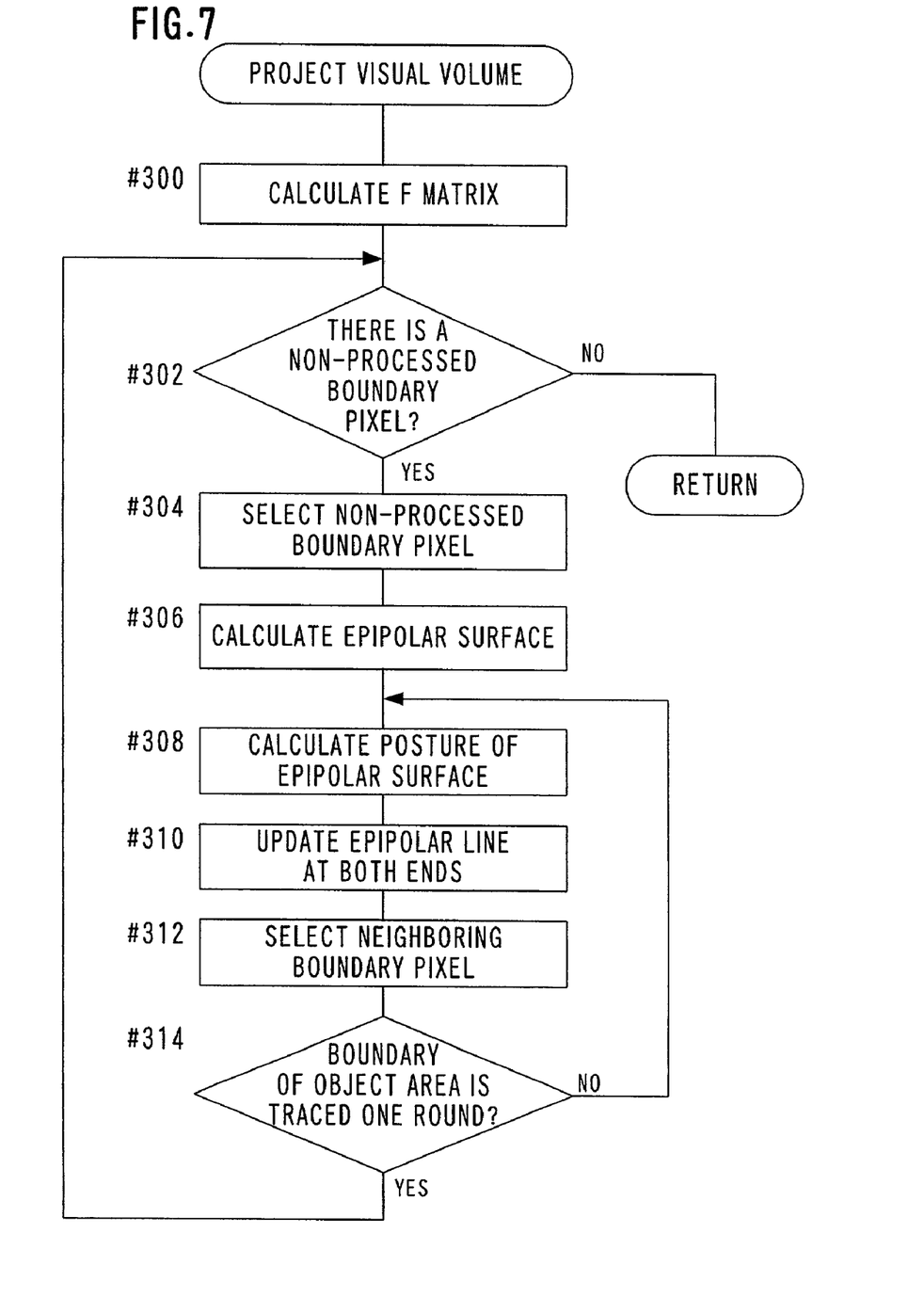
FIG. 7 is a flowchart showing a detail procedure of projection of a visual volume.

FIG. 7 is a flowchart showing a detail procedure of the projection of the visual volume.

[1] In Step #300, the F matrix calculation is performed. The F matrix between the images $I_i$ and $I_j$ is calculated by the following equation.

$$F = (A_j^{-1})^t T_{ji} R_{ji} A_i^{-1} \tag{9}$$

$$R_{ji} = R_j R_i^t$$

$$T_{ji} = \begin{bmatrix} 0 & t_z & -t_y \\ -t_z & 0 & t_x \\ t_y & -t_x & 0 \end{bmatrix}$$

$$t_{ji} = \begin{bmatrix} t_x \\ t_y \\ t_z \end{bmatrix} = -R_{ji} t_i + t_j$$

Here, F is a 3×3 matrix. A set of points $(x_i, y_i)$ on the image $I_i$ that satisfies the following equation indicates a line obtained by projecting the line of sight passing through the image coordinates $(x_j, y_j)$ of the image $I_j$ onto the image $I_i$.

$$[x_j \ y_j \ 1] F \begin{bmatrix} x_i \\ y_i \\ 1 \end{bmatrix} = 0 \tag{10}$$

This line $e_j$ is called an epipolar line. The line of sight of the image $I_j$ projected on the image $I_i$ passes through a point on the image $I_i$ called an epipole. The image coordinates of the epipole on the image $I_i$ is given as $(e_x/e_z, e_y/e_z)$, when $(e_x, e_y, e_z)$ denotes an eigenvector corresponding to the zero eigenvalue of the matrix F. However, when $e_z$ is zero, the epipole is at the end point at infinity, so all the epipolar lines on the image $I_i$ are lines parallel to the vector $(e_x, e_y)$. In addition, the epipole on the image $I_j$ can be determined from the eigenvector corresponding to the zero eigenvalue of the matrix $F^t$ in the same way.

[2] In Step #302, it is checked whether there is a non-processed boundary pixel or not. In the image $I_j$, it is checked whether the boundary pixels of the object area are all processed or not. If all the boundary pixels are processed, the process goes back to Step #206. If there is a non-processed boundary pixel, the process goes to Step #304.

[3] In Step #304, a non-processed boundary pixel is selected. In the image $I_j$, any one of the boundary pixels is selected from the first non-processed object area $S_j^l$.

[4] In Step #306, the calculation of the epipolar surface is performed. The coordinates of the point in the three-dimensional space indicated by the camera coordinates of the image $I_i$ is denoted by $(X_i, Y_i, Z_i)$, and the coordinate value of the boundary pixel selected in Step #304 is denoted by $(x_j, y_j)$. Then, the equation of the plane determined by the line of sight that passes the point $(x_j, y_j)$ of the image $I_j$ and the camera eye point of the image $I_i$ is calculated as follows.

$$[x_j \ y_j \ 1] F A_i \begin{bmatrix} X_i \\ Y_i \\ Z_i \end{bmatrix} = 0 \tag{11}$$

The plane $E_j$ defined by this equation is called an epipolar surface. The intersection of the epipolar surface and the projection surface of the image is the epipolar line $e_j$. The vector containing the elements that are coefficients of $X_i$, $Y_i$, and $Z_i$ in this equation is made a unit vector $n_j$, which is stored in the memory of the computer 60. The vector $n_j$ indicates the normal direction of the epipolar surface $E_j$.

[5] In Step #308, the posture of the epipolar surface is calculated. From the following equation, the angle $\theta_j$ between the normal of the epipolar surface $E_j$ and the optical axis of the camera of the image $I_i$ is derived.

$$\cos \theta_j = [0 \ 0 \ 1] n_j \tag{12}$$

[6] In Step #310, the epipolar lines at both ends are updated. There can be an object area on the epipolar line $e_j$ on the image $I_i$ corresponding to the epipolar surface $E_j$, so the both ends of the area where the epipolar line corresponding to the object area $S_j^l$ exists is traced as below.

The epipolar line $e_j$ corresponding to the epipolar surface $E_j$ is given by the following equation concerning the parameter $(x_i, y_i)$.

$$n_j^t A_i^{-1} \begin{bmatrix} x_i \\ y_i \\ 1 \end{bmatrix} = 0 \tag{13}$$

If the coefficient vectors $m_{ji}^+$ and $m_{ji}^-$ of the epipolar lines $e_{ji}^+$ and $e_{ji}^-$ at both ends corresponding to the object area $S_j^l$ are not saved, the coefficient vector of the epipolar line $e_j$ is saved as $m_{ji}^+$ and $m_{ji}^-$ unconditionally. Namely, the following equation is satisfied.

$$m_{ji}^+ = m_{ji}^- = (n_j^t A_i^{-1})^t \tag{14}$$

At the same time, the angle $\theta_j$ calculated in Step #308 is saved in the memory of the computer 60 as the angles $\theta_{ji}^+$ and $\theta_{ji}^-$ of the epipolar surface corresponding to the epipolar lines $e_{ji}^+$ and $e_{ji}^-$. Namely, the following equation is satisfied.

$$\cos \theta_{ji}^+ = \cos \theta_{ji}^- = \cos \theta_j \tag{15}$$

If the coefficient vectors $m_{ji}^+$ and $m_{ji}^-$ of the epipolar line at both ends are already saved, $m_{ji}^+$ and $\theta_{ji}^+$ are updated only when $\theta_j$ is larger than $\theta_{ji}^+$, and $m_{ji}^-$ and $\theta_{ji}^-$ are updated only when $\theta_j$ is smaller than $\theta_{ji}^-$. Namely, the following equation is satisfied.

$$m_{ji}^+ = (n_j^t A_i^{-1})^t, \ \cos \theta_{ji}^+ = \cos \theta_j \text{ if } \cos \theta_{ji}^+ > \cos \theta_j$$

$$m_{ji}^- = (n_j^t A_i^{-1})^t, \ \cos \theta_{ji}^- = \cos \theta_j \text{ if } \cos \theta_{ji}^- < \cos \theta_j \tag{16}$$

[7] In Step #312, a neighboring boundary pixel is selected. The next boundary pixel is selected by tracing the boundary in the counterclockwise direction from the selected boundary pixel.

[8] In Step #314, it is checked whether the boundary of the object area is traced one round or not. If the newly selected boundary pixel is already processed, all the boundary pixels of the first object area $S_j^l$ are processed. Then, the process goes back to Step #302, and the process of the boundary pixels of other object areas is started. If it is not processed yet, the process goes back to Step #306.

In the above-mentioned embodiment, there are several variations as follows.

[Variation 1] It is possible that the colors of the tool 40 and the rotating table 30 are not known, Step #210 is omitted when extracting the object area, and the user extracts the object area by a predetermined operation. When adopting this variation, the user is required only to erase excess object area without adding a new object area since the intersection area of the projected visual volume involves the real object area completely. In addition, there is a merit of low frequency that the user is bothered by a complicated operational procedure.

[Variation 2] It is possible that the colors of the tool 40 and the rotating table 30 are not known, and the color to be given as known is obtained by sampling in the image area outside the intersection area of the visual volume in Step #210. Thus, the system becomes resistant to the influence of variation of the lighting environment.

[Variation 3] Instead of the configuration where the inner parameter and the position and posture parameter of the digital camera 10 is calibrated online using the tool 40 and the rotating table 30, it is possible to calibrate the inner parameter of the camera offline in advance without the tool and to obtain the position and posture parameter by using a digital camera disposed at the tip of a robot arm as described in U.S. Pat. No. 05,402,582, "Three dimensional coordinate measuring apparatus". Alternatively, the digital camera 10 can be equipped with a position and posture sensor detecting a magnetic field as described in U.S. Pat. No. 05,307,072, "Non-concentricity compensation in position and orientation measurement systems" or a combination of a gyroscope sensor and an acceleration sensor, so as to obtain the position and posture parameter. This variation can be combined with Variation 1, so as to process completely in any background.

[Variation 4] In the above-mentioned example, onto the target image of the area extraction, the visual volume of the other image is projected, and then the intersection area of the projected image area is calculated. However, it is possible that the intersection of the visual volume in the three-dimensional space is determined, and then the three-dimensional volume is projected onto the image that is noted as a target of the area extraction. In other words, it is possible to exchange the execution orders of Step #116 and Step #118 in FIG. 3, to project the three-dimensional shape data updated in Step #118 onto the noted image instead of Step #200 through Step #208, and to mark for indicating the pixel in the projection image area as a process target.

[Variation 5] In Variation 4 the correction of the extracted object area is performed on a two-dimensional image. However, it is possible to correct the object area indirectly by correcting the intersection of the visual volume itself in the three-dimensional space.

[Variation 6] It is possible to use the result of the area extraction as information for tracking a position of the object in the image. In other words, when adopting the method (R. Cipolla and A. Blake, "The Dynamic Analysis of Apparent Contours," Proc. Third ICCV, 1990), in which sequential images are obtained by moving the camera continuously for shooting the object, the parameter in the previous image is used as an initial value for fitting the contour model called a snake into the contour of the object. In this case, the result of the area extraction is used as the initial value.

[Variation 7] It is possible not to use the tool 40 for calibrating the inner parameter and the position and posture parameter of the digital camera 10, and to perform the calibration of the parameters by determining any corresponding points of the object and the background between the images.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A method for processing image data, comprising the steps of:
    shooting an object from different eye points so as to obtain a plurality of images;
    extracting an object area that is a portion corresponding to the object from the images;
    obtaining shoot condition data indicating the positional relationship between a camera and the object and an optical parameter concerning image formation when previously obtaining the images so as to extract the object area for each of the images sequentially and refer to a result of the extraction that is performed previously when performing the extraction about a second and subsequent images; and
    estimating the object area in the second and subsequent images in accordance with the object area extracted from a previous image and the shoot condition data of the previous image.

2. A method as recited in claim 1, further comprising the step of correcting the estimated object area by data processing about the image including the object area.

3. A method as recited in claim 1, further comprising the step of correcting the estimated object area by using color information of a background area that is a portion except the estimated object area.

4. An image data processor for extracting an object area that is a portion corresponding to an object from a plurality of images obtained by shooting the object from different eye points, the processor comprising:
    an obtaining portion for obtaining shoot condition data indicating the positional relationship between a camera and the object and an optical parameter concerning image formation when previously obtaining the images so as to extract the object area for each of the images sequentially and refer to a result of the extraction that is performed previously when performing the extraction about a second and subsequent images; and
    an estimating portion for estimating the object area in the second and subsequent images in accordance with the object area extracted from another image and the shoot condition data of the other image.

5. An image data processor as recited in claim 4, further comprising a correcting portion for correcting the estimated object area.

6. An image data processor as recited in claim 5, wherein the correcting portion has a function for displaying an image obtained by projecting the visual volume.

7. A method for processing image data, comprising the steps of:
    shooting an object from different eye points so as to obtain a plurality of images;
    extracting an object area that is a portion corresponding to the object from the images;
    obtaining shoot condition data indicating the positional relationship between a camera and the object and an optical parameter concerning image formation when obtaining the images; and estimating the object area in one image in accordance with the object area extracted from another image and the shoot condition data of the other image, wherein the estimating step includes the steps of arranging the image to be processed and the other image to be used for the process virtually and in a three-dimensional manner in accordance with the shoot condition data, and estimating the object area by projecting a visual volume determined by the object area extracted from the other image and the shoot condition data onto the image to be processed.

8. A method for processing image data, comprising the steps of:

shooting an object from different eye points so as to obtain a plurality of images;

extracting an object area that is a portion corresponding to the object from the images;

obtaining shoot condition data indicating the positional relationship between a camera and the object and an optical parameter concerning image formation when obtaining the images; and estimating the object area in one image in accordance with the object area extracted from another image and the shoot condition data of the other image, wherein the estimating step includes the steps of arranging the image to be processed and the other images to be used for the process virtually and in a three-dimensional manner in accordance with the shoot condition data, projecting a plurality of visual volumes determined by the object areas extracted from the other images and the shoot condition data onto the image to be processed, and estimating the object area by determining an area where the projected images overlap one another.

9. A method for processing image data, comprising the steps of:

shooting an object from different eye points so as to obtain a plurality of images;

extracting an object area that is a portion corresponding to the object from the images;

obtaining shoot condition data indicating the positional relationship between a camera and the object and an optical parameter concerning image formation when obtaining the images; and estimating the object area in one image in accordance with the object area extracted from another image and the shoot condition data of the other image, wherein the estimating step includes the steps of arranging the image to be processed and the other images to be used for the process virtually and in a three-dimensional manner in accordance with the shoot condition data, and estimating the object area by projecting an intersection portion among the plural visual volumes determined by the object areas extracted from the other images and the shoot condition data in the three-dimensional virtual space onto the image to be processed.

10. An image data processor for extracting an object area that is a portion corresponding to an object from a plurality of images obtained by shooting the object from different eye points, the processor comprising:

an obtaining portion for obtaining shoot condition data indicating the positional relationship between a camera and the object and an optical parameter concerning image formation when obtaining the images; and an estimating portion for estimating the object area in one image in accordance with the object area extracted from another image and the shoot condition data of the other image, wherein the estimating portion arranges the image to be processed and the other image to be used for the process virtually and in a three-dimensional manner in accordance with the shoot condition data, and estimate the object area by projecting a visual volume determined by the object area extracted from the other image and the shoot condition data onto the image to be processed.

11. A method for modeling, comprising the steps of:

shooting an object from different eye points so as to obtain a plurality of images;

estimating a three-dimensional shape of the object in accordance with the images;

obtaining shoot condition data indicating the positional relationship between a camera and the object and an optical parameter concerning image formation when obtaining the images;

estimating an object area that is a portion corresponding to the object in one image in accordance with the object area extracted from another image and the shoot condition data of the other image;

arranging the images virtually and in a three dimensional manner in accordance with the shoot condition data; and estimating the three-dimensional shape of the object in accordance with the object area extracted from the images and the shoot condition data.

12. A modeling device for estimating a three dimensional shape of an object in accordance with a plurality of images obtained by shooting the object from different eye points, the device comprising:

an obtaining portion for obtaining shoot condition data indicating the positional relationship between a camera and the object and an optical parameter concerning image formation when obtaining the images;

an estimating portion for estimating an object area that is a portion corresponding to the object in one image in accordance with the object area extracted from another image and the shoot condition data of the other image; and an arranging portion for arranging the images virtually and in a three-dimensional manner in accordance with the shoot condition data and estimating the three-dimensional shape of the object in accordance with the object area extracted from the images and the shoot condition data.

13. A computer readable medium storing a program for modeling in which a three-dimensional shape of an object is estimated in accordance with a plurality of images obtained by shooting the object from different eye points, the program making a computer work as:

an obtaining portion for obtaining shoot condition data indicating the positional relationship between a camera and the object and an optical parameter concerning image formation when obtaining the images;

an estimating portion for estimating an object area that is a portion corresponding to the object in one image in accordance with the object area extracted from another image and the shoot condition data of the other image; and an arranging portion for arranging the images virtually and in a three-dimensional manner in accordance with the shoot condition data and estimating the three-dimensional shape of the object in accordance with the object area extracted from the images and the shoot condition data.

* * * * *